(12) United States Patent
Zimmer

(10) Patent No.: US 6,193,217 B1
(45) Date of Patent: Feb. 27, 2001

(54) CABLE PULLER

(75) Inventor: Mickey Zimmer, 3313 Yorkshire Ct., Adamstown, MD (US) 21710

(73) Assignee: Mickey Zimmer, Adamstown, MD (US)

( * ) Notice: Subject to any disclaimer, the term of this patent is extended or adjusted under 35 U.S.C. 154(b) by 0 days.

(21) Appl. No.: 09/373,725

(22) Filed: Aug. 13, 1999

(51) Int. Cl.⁷ ...................................................... F21C 29/16
(52) U.S. Cl. ................................................... 254/134.3 FT
(58) Field of Search ................................. 254/134.3 FT, 254/134.3 R; 294/92, 143, 87.1, 87.28, 82.1

(56) References Cited

U.S. PATENT DOCUMENTS 2,727,720   12/1955   Barth .
3,861,650   1/1975    Jackson .
4,171,123 * 10/1979   Woelkers .................... 254/134.3 FT
4,684,211   8/1987    Weber et al. .
5,330,244 * 7/1994    Rodwell ............................. 294/143

FOREIGN PATENT DOCUMENTS 182435    6/1955    (AT) .
663781    12/1961   (CA) .
491607    3/1992    (JP) .
197710    11/1977   (SU) .

* cited by examiner

Primary Examiner—Robert C. Watson
(74) Attorney, Agent, or Firm—Carlson, Gaskey & Olds

(57) ABSTRACT

A cable puller including a flat plate with a front end and a rear end. The plate has an aperture adjacent the front end for attachment to a drag line and an opening adjacent the rear end for attachment to a number of cables. The opening has a rear side with a number of spaced-apart fingers defining slots therebetween for the individual placement of the cables.

9 Claims, 1 Drawing Sheet

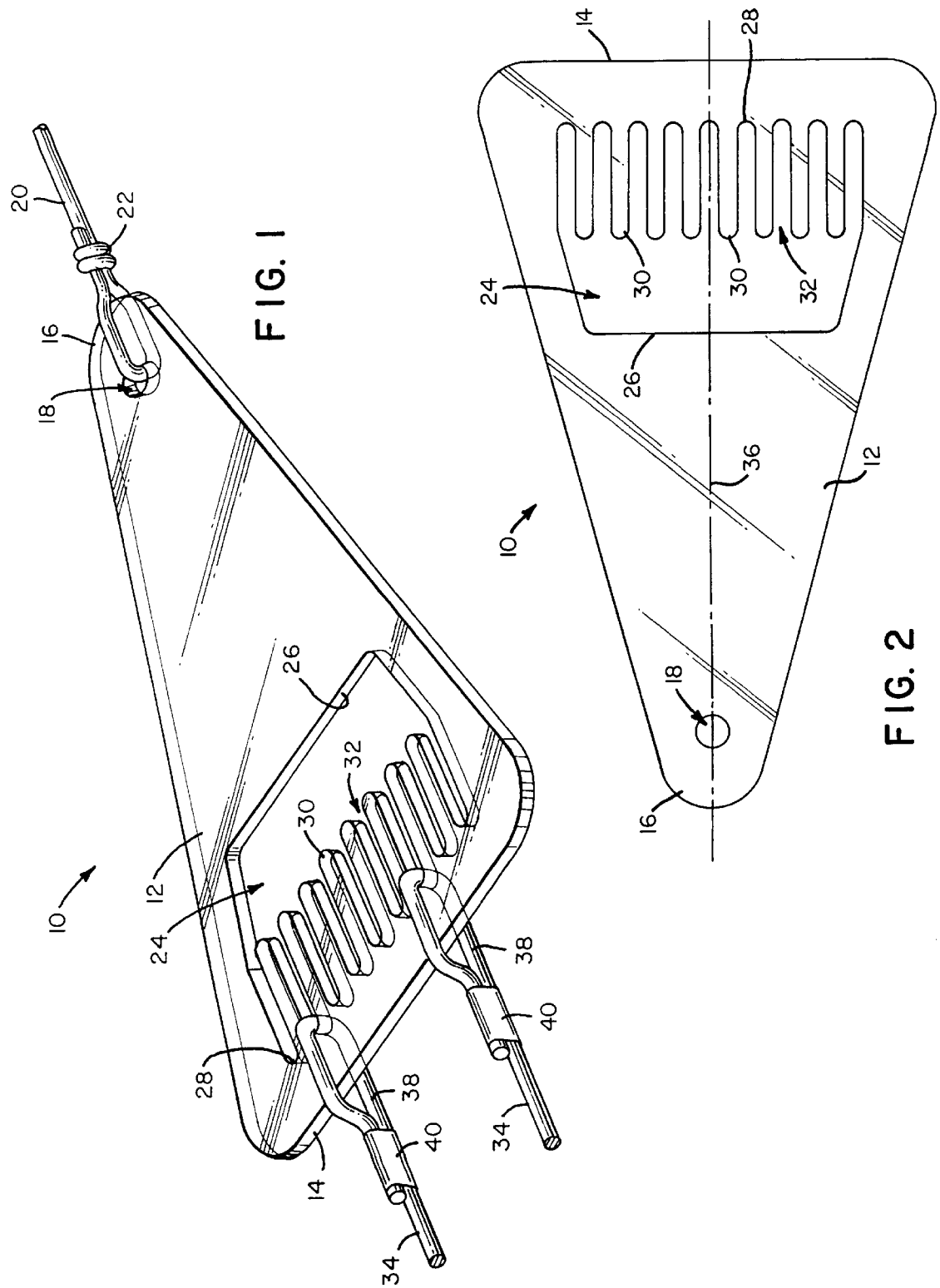

CABLE PULLER

FIELD OF THE INVENTION

The present invention relates generally to implements for the application of pushing and pulling force and, in particular, to apparatus for the placement of cables.

BACKGROUND OF THE INVENTION

Twisted-pair and optical fiber cables are commonly installed in buildings to accommodate voice and data communications systems as well as local area networks (LANs). To position these cables within the structures provided to distribute and support such, installers frequently attach a drag line to a bundle of cables and then pull such along a predetermined pathway through the structures. Unfortunately, cables pulled in this manner have a tendency to twist thereby making it difficult to pull additional cables through tight spaces along the same pathway.

Exceeding the maximum pulling tension recommended by a cable manufacturer may have dire consequences since a damaged cable may not perform to specifications, if at all. Deficiencies in performance may not be initially apparent but may manifest themselves at a later date when expansion of a communications system to its design limits cannot be achieved. Thus, it is important to minimize tension while pulling multiple, twisted-pair and optical fiber cables.

SUMMARY OF THE INVENTION

In light of the problems associated with the known methods and apparatus used to install cables for communications systems and LANs in building structures, it is a principal object of the invention to provide a cable puller which will simultaneously draw a plurality of cables along a predetermined pathway through a building structure without spiraling and with substantially equal tension being applied to each of the cables. Thus, the likelihood of cable damage is reduced since an installer is ensured that the maximum pulling tension of the cables will not be not exceeded during use of the cable puller.

It is another object of the invention to provide a cable puller of the type described to which a predetermined number of cables may be attached for pulling without resort to special tools or hardware. Thus, one or more cables may be towed by the cable puller at any one time.

It is an object of the invention to provide improved elements and arrangements thereof in a cable puller for the purposes described which is lightweight in construction, inexpensive to manufacture, and dependable in use.

Briefly, the cable puller in accordance with this invention achieves the intended objects by featuring a flat plate which tapers evenly in width from its rear end to its front end in the manner of an isosceles triangle. The plate has an aperture adjacent its front end for attachment to a drag line and an opening adjacent its rear end for attachment to a plurality of cables. The opening has a rear side with spaced-apart fingers defining slots for individually receiving the cables in a non-binding way.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a perspective view of a cable puller in accordance with the present invention connected to a drag line and a pair of cables.

FIG. 2 is a top view of the cable puller of FIG. 1.

Similar reference characters denote corresponding features consistently throughout the accompanying drawings.

DETAILED DESCRIPTION OF THE PREFERRED EMBODIMENT

Referring now to the FIGS., a cable puller in accordance with the present invention is shown at 10. Cable puller 10 includes a flat plate 12 formed of a dielectric, plastic material. Preferably, plate 12 is shaped like an isosceles triangle and tapers evenly in width from its rear end 14 to its relatively narrow, front end 16.

An aperture 18 is provided in plate 12 adjacent front end 16. Aperture 18 is circular in form and is sized for receiving a drag line 20. After passing one end of drag line 20 through aperture 18, drag line 20 is tied by means of a knot 22 to front end 16.

Adjacent rear end 14, an opening 24 is provided in plate 12 having front and rear sides 26 and 28 which are substantially parallel to one another and to rear end 14. Extending forwardly from rear side 28 are a plurality of spaced-apart fingers 30 defining slots 32 into which may be slipped one or more cables 34. Preferably, each finger 30 extends about halfway across opening 24 toward front side 16 to prevent a cable 34 from sliding from a slot 32 when being initially positioned therein as well as to reduce the likelihood of fingers 30 snagging on objects while pulling is underway.

The right and left portions of plate 12, located on opposite sides of center line 36, are mirror images of one another. Opening 24 and aperture 18 are, therefore, centered on the center line 36. Also, the same number of fingers 30 are provided on opposite sides of center line 36. With this balanced configuration, even pulling of cables 34 can be ensured.

Use of cable puller 10 is straightforward. First, drag line 20, which has previously been routed along a predetermined pathway within a building structure, is run through aperture 18 and tied to front end 16 of plate 12. Next, the ends of one or more cables 34 are: extended through opening 24, positioned in slots 32 and folded back upon themselves so as to form loops 38 which retain the rear end 14 of plate 12. Loops 38 are, then, closed by wrapping adhesive tape 40 around the end of each cable 34 and the adjacent portion thereof.

By applying tension to the remote end of drag line 20, cable puller 10 and cables 34 are drawn along the predetermined pathway which may include: underfloor ducts, cellular floors, conduits, raised floors, ceiling zones and cable trays. The tension applied to the drag line 20 and, hence, cables 34 may be measured by a gauge (not shown) attached to drag line 20 but may also be judged "by feel." The construction of cable puller 10 ensures that cables 34 will be drawn at an equal rate, at a substantially equal tension and without spiraling and twisting. After cables 34 have been fully drawn along the predetermined pathway, tape 40 is removed, cable puller 10 is withdrawn for reuse, and cables 34 are attached to a communications system in the usual manner.

While the invention has been described with a high degree of particularity, it will be appreciated by those skilled in the art that modifications may be made thereto. For example, the number of fingers 30 provided in opening 24 may be varied as desired. Therefore, it is to be understood that the present invention is not limited to the sole embodiment described above, but encompasses any and all embodiments within the scope of the following claims.

I claim:

1. A cable puller comprising a flat plate having a front end and a rear end, said plate further having an aperture adjacent said front end and an opening adjacent said rear end for attachment to a plurality of cables, said opening having a rear side with a plurality of spaced-apart fingers defining slots therebetween for receiving the plurality of cables, a flexible drag line attached to said aperture.

2. The cable puller according to claim 1 wherein said plate tapers in width from said front end to said rear end and the front end is narrower than the rear end.

3. The cable puller according to claim 1 wherein said plate is formed from a dielectric material.

4. A cable puller comprising a flat plate having a rear end and a front end and tapering in width from said rear end to said front end, said plate further having an aperture adjacent said front end for attachment to a drag line and an opening spaced from the aperture and adjacent said rear end for attachment to a plurality of cables, said opening having a rear side with a plurality of spaced-apart fingers defining slots therebetween for receiving the plurality of cables, said fingers extending tom said rear side about one-half the distance across said opening.

5. The cable puller according to claim 4 wherein said plate is formed from a dielectric material.

6. The cable puller of claim 4 wherein the plate is generally in the shape of an isosceles triangle.

7. The cable puller of claim 1 further including a plurality of cables secured to said plurality of spaced-apart fingers.

8. The cable puller of claim 7, wherein the plurality of cables are optical fibers.

9. The cable puller of claim 1, wherein the plurality of cables are twisted pair cables.

* * * * *